US009329414B2

(12) United States Patent
Teraoka et al.

(10) Patent No.: US 9,329,414 B2
(45) Date of Patent: May 3, 2016

(54) METHODS USING AN INTENSE CONTROL LIGHT AT A FIRST WAVELENGTH TO CAUSE A WHISPERING GALLERY MODE RESONATOR TO SELF TUNE AT A SECOND WAVELENGTH, AND APPARATUS EMPLOYING SUCH METHODS SUCH AS OPTICAL PASS/STOP BAND FILTERS AND OPTICAL DEMULTIPLEXERS

(71) Applicants: Iwao Teraoka, Rye, NY (US); Monica Agarwal, Ozone Park, NY (US)

(72) Inventors: Iwao Teraoka, Rye, NY (US); Monica Agarwal, Ozone Park, NY (US)

(73) Assignee: Polytechnic Institute of New York University, Brooklyn, NY (US)

(*) Notice: Subject to any disclaimer, the term of this patent is extended or adjusted under 35 U.S.C. 154(b) by 170 days.

(21) Appl. No.: 14/140,051

(22) Filed: Dec. 24, 2013

(65) Prior Publication Data

US 2014/0177024 A1    Jun. 26, 2014

Related U.S. Application Data

(60) Provisional application No. 61/745,698, filed on Dec. 24, 2012.

(51) Int. Cl.
*G02F 1/03*    (2006.01)
*G02F 1/07*    (2006.01)
*G02F 1/01*    (2006.01)
*G02F 1/21*    (2006.01)
*H04J 14/02*   (2006.01)

(52) U.S. Cl.
CPC ............ *G02F 1/0126* (2013.01); *G02F 1/0131* (2013.01); *G02F 1/21* (2013.01); *G02F 2203/055* (2013.01); *G02F 2203/15* (2013.01); *G02F 2203/585* (2013.01); *H04J 14/02* (2013.01)

(58) Field of Classification Search
CPC .......... G02B 6/29341; G02B 6/29343; G02B 6/29395; G02B 6/12007; G02B 6/262; G02B 6/4215
USPC ............ 359/239, 244, 245, 326, 328; 372/22, 372/32, 99; 385/15, 27
See application file for complete search history.

(56) References Cited

U.S. PATENT DOCUMENTS

| | | | |
|---|---|---|---|
| 8,417,076 B2 * | 4/2013 | Maleki et al. ................... 385/30 |
| 2006/0193557 A1 * | 8/2006 | Bradley et al. .................. 385/32 |
| 2009/0022455 A1 * | 1/2009 | Hillis ..................... B82Y 20/00 |
| | | | 385/39 |
| 2010/0230621 A1 * | 9/2010 | Rideout et al. ................ 250/551 |

* cited by examiner

*Primary Examiner* — Mahidere Sahle
(74) *Attorney, Agent, or Firm* — John C. Pokotylo; Straub & Pokotylo

(57) ABSTRACT

An all-photonic method to cause a WGM resonator to self-tune to a given wavelength is described. Such all photonic approaches include simply superimposing intense light of a wavelength in a range different from that of a signal wave. The wavelength of the pass band for the signal wavelength can be tuned by adjusting the wavelength (and/or the intensity) of the intense light.

20 Claims, 8 Drawing Sheets

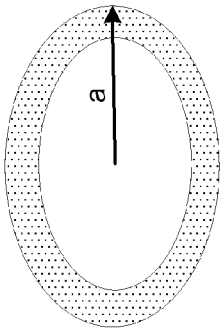
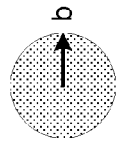
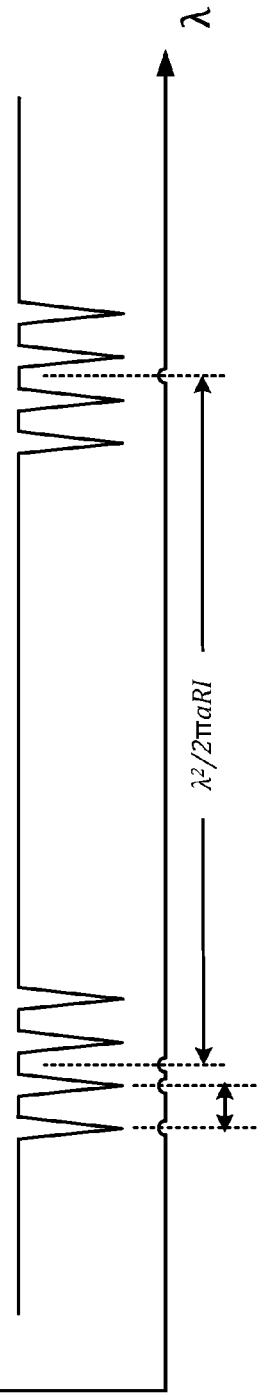

US 9,329,414 B2

METHODS USING AN INTENSE CONTROL LIGHT AT A FIRST WAVELENGTH TO CAUSE A WHISPERING GALLERY MODE RESONATOR TO SELF TUNE AT A SECOND WAVELENGTH, AND APPARATUS EMPLOYING SUCH METHODS SUCH AS OPTICAL PASS/STOP BAND FILTERS AND OPTICAL DEMULTIPLEXERS

§0. RELATED APPLICATION(S)

This application claims the benefit of U.S. Provisional Patent Application Ser. No. 61/745,698 (incorporated herein by reference and referred to as "the '698 provisional"), filed on Dec. 24, 2012, titled "OPTICAL FIBER FILTER STABILIZED BY SELF-TUNING WHISPERING GALLERY MODE" and listing Iwao TERAOKA as the inventor. The present invention is not limited to requirements of the particular embodiments described in the '698 provisional application.

§1. BACKGROUND INFORMATION

Whispering gallery mode ("WGM") resonators have an extremely high quality factor ("Q"), and therefore a narrow pass band, when used as a filter in telecommunication applications. For example, optical filter 110 of FIG. 1 filters out light at wavelengths at $\lambda_1$ and $\lambda_3$, while allowing light at $\lambda_2$ to pass. Wavelength division multiplexing ("WDM") has been used to carry multiple signals over one strand of optical fiber by superimposing light waves of different wavelengths. For example, FIG. 2 shows an optical coupler 210 receiving multiple input signals 205 (e.g., in the 1500 nm range) and outputting a multiplexed signal 215. A high density version of WDM, called dense WDM ("DWDM"), has also been implemented to carry more signals (e.g., 40 channels at 100 GHz (~0.8 nm spacing)) than does the conventional or coarse WDM ("CWDM") (e.g., 8 channels at 20 nm spacing). The decomposition of signals into individual components at the receiving end relies on filters. For example, referring back to FIG. 2, an optical splitter/filter 220 may be used to separate the superimposed waves to provide multiple output signals 225 corresponding to the multiple input signals 205.

Currently, fiber Bragg gratings ("FBGs") are widely used as optical filters. FBGs having 0.5 to 1 nanometer (nm) wide wavelength pass bands are known. Unfortunately, however, to decrease the width of the pass band, the physical size of an FBG must be increased. This increased sized makes FBGs impractical for some applications. Further, as the size of an FBG increases, its susceptibility to environmental factors such as changes in ambient temperature increases. Therefore, FBGs become less practical as the packing density of DWDM increases.

The spacing between adjacent channels can be decreased if the width of each of the filters' respective pass band is decreased, for example, by employing high-Q filters. For example, FIG. 3 depicts the narrow pass band $\lambda_r$ (e.g., with a width of 0.1 to 0.01 pm and a Q of $10^7$ to $10^8$) of a WGM resonator 310. Unfortunately, however, the precision of the pass band wavelength and its vulnerability to environmental changes becomes a problem as more wavelength components are packed into a given range of wavelength. That is, the pass band wavelength of a WGM resonator may shift, for example due to environmental factors, such as changes in ambient temperature for example. For applications in which many close wavelengths are multiplexed within a narrow range, such a shift in the pass band wavelength becomes unacceptable.

Past studies on tuning the wavelength of a WGM resonator involve the use of piezoelectricity. Such studies include the following references:
1. M. Eichenfield, C. P. Michael, R. Perahia, and O. Painter, Nature Photon. 1, 416 (2007);
2. W. von Klitzing, R. Long, V. S. Ilchenko, J. Hare, and V. Lefèvre-Seguin, New J. Phys. 3, 14.1 (2001);
3. G. Farca, S. I. Shopova, and A. T. Rosenberger, Opt. Exp. 15, 17443 (2007);
4. Q. Lin, T. J. Johnson, C. P. Michael, and O. Painter, Opt. Exp. 16, 14801 (2008).
5. J. Rosenberg, Q. Lin, and O. Painter, Nature Photon. 3, 478 (2009);
6. M. Pöllinger, D. O'Shea, F. Warken, and A. Rauschenbeutel, Phys. Rev. Lett. 103, 053901 (2009);
7. D. O'Shea, A. Rettenmaier and A. Rauschenbeutel, Appl. Phys. B 99, 623 (2010); and
8. P. T. Rakich, M. A. Popović, M. Soljačić, E. P. Ippen, Nature Photon. 1, 658 (2007).

(Each of the foregoing eight references is incorporated herein by reference.)

Typically, mechanical strain is used to physically deform the WGM resonator, thereby changing the resonance wavelength (by changing the resonator's effective optical path length). As is understood by those having ordinary skill in the art, "optical path length" is defined as a physical length of an optical path * the refractive index of the resonator, and an "effective optical path length" is defined as a physical length of an optical path * the effective refractive index. Unfortunately, systems using mechanical strain to physically deform the WGM resonator use a complicated feedback mechanism to construct a tunable filter or to stabilize the pass band wavelength. It would be useful to avoid such complicated feedback mechanisms. Example embodiments consistent with the present invention avoid such complicated feedback mechanisms.

§2. SUMMARY OF THE INVENTION

Example embodiments consistent with the present invention solve the vulnerability of a fiber filter's pass band wavelength to environmental changes, such as changes in ambient temperature. Further, example embodiments consistent with the present invention provide an all-photonic method to cause a WGM resonator to self-tune to a given wavelength. Such example all photonic approaches include simply superimposing intense light of a wavelength in a range different from that of a signal wave. The inventors believe that this intense light causes the resonator to make a small deformation to self tune at the given wavelength. Concomitantly, the wavelength of the pass band for the signal wavelength can be tuned by adjusting the wavelength (and/or the intensity) of the intense light.

§3. BRIEF DESCRIPTION OF THE DRAWINGS

FIGS. 7A-7C depict the spectrum of a resonator (intensity of light in the fiber after the resonator, plotted as a function of wavelength) for a toroidal resonator.

§4. DETAILED DESCRIPTION OF EXAMPLE EMBODIMENT(S)

The present invention may involve novel methods, apparatus, message formats, and/or data structures for using an intense control light at a first wavelength to cause a WGM resonator to self-tune to the first wavelength. By adjusting the tuning condition, a signal at a second wavelength can be stopped or passed. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present invention unless explicitly described as such. Also, as used herein, the article "a" is intended to include one or more items. Where only one item is intended, the term "one" or similar language is used. Thus, the present invention is not intended to be limited to the embodiments shown and the inventors regard their invention as any patentable subject matter described.

§4.1 Optical Filtering/Demultiplexing

§4.1.1 Example Demultiplexing Environment

Figure 4:
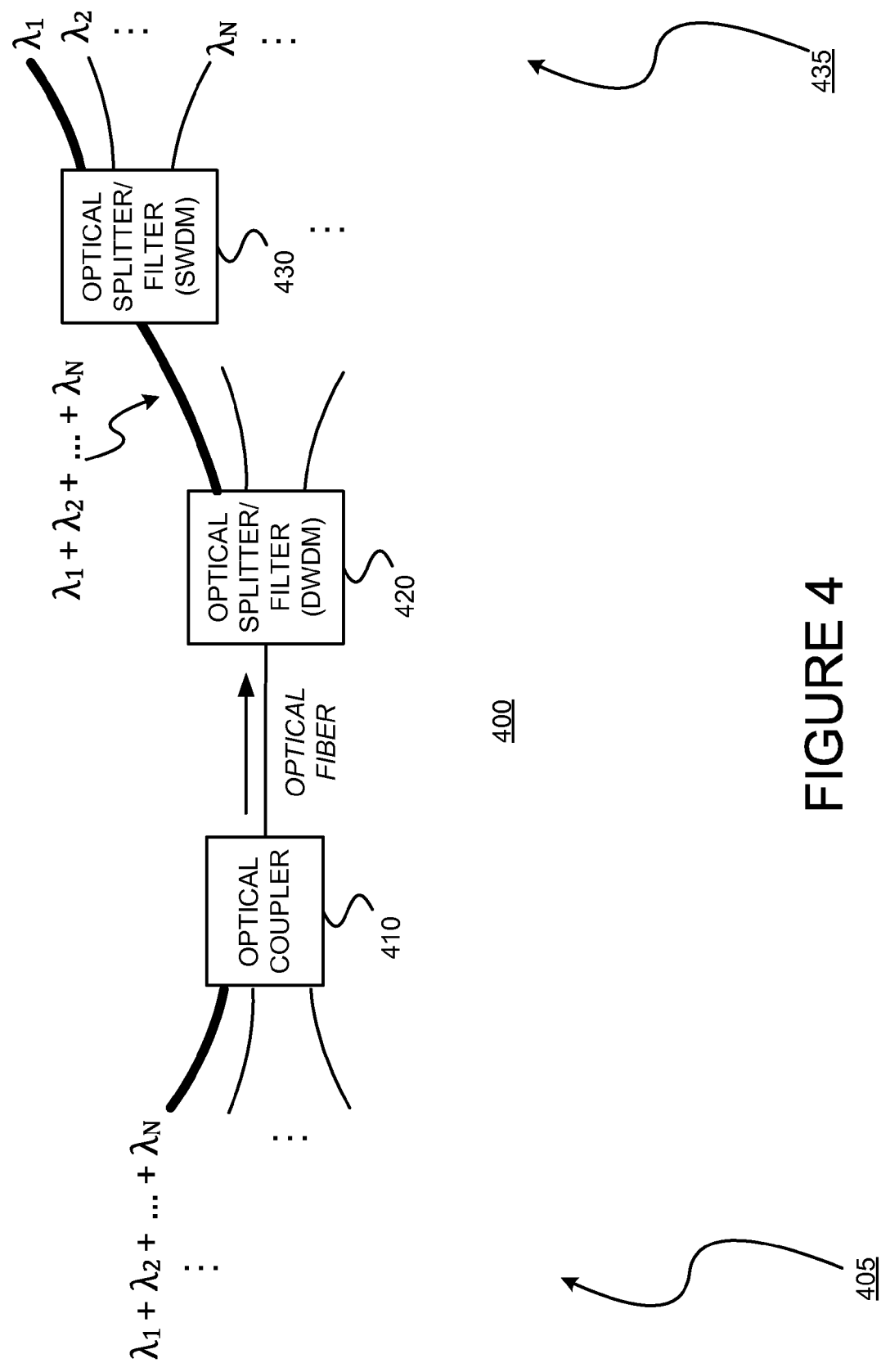
FIG. 4 illustrates dense wavelength division multiplexing and demultiplexing.

Example embodiments consistent with the present invention solve the problem of stabilizing pass band wavelengths, and permit many wavelengths to be placed into one of the DWDM bands (e.g., ~0.8 nm), thereby enabling Super WDM ("SWDM"). For example, as shown in FIG. 4, a number of already multiplexed signals 405 are further multiplexed by an optical coupler 410. A DWDM optical splitter/filter 420 can separate the multiplexed signal into a number of wavebands, each still carrying multiplexed signals. A plurality of SWDM optical splitter/filters 430 (only one of which is shown) are then used to further demultiplex each of the outputs of the DWDM optical splitter/filter 420. Alternatively, the combination of the DWDM optical splitter/filter 420 and SWDM optical splitters/filters 430 can be replaced with one or more SWDM optical splitters/filters. It is believed that SWDM should permit a 10-100 fold increase in the number of channels over DWDM.

Having introduced an example SWDM environment 400, an example optical filtering method consistent with the present invention is described in §4.1.2 and an example demultiplexer consistent with the present invention is described in §4.1.3.

§4.1.2 Example Optical Filter Method

Figure 5:
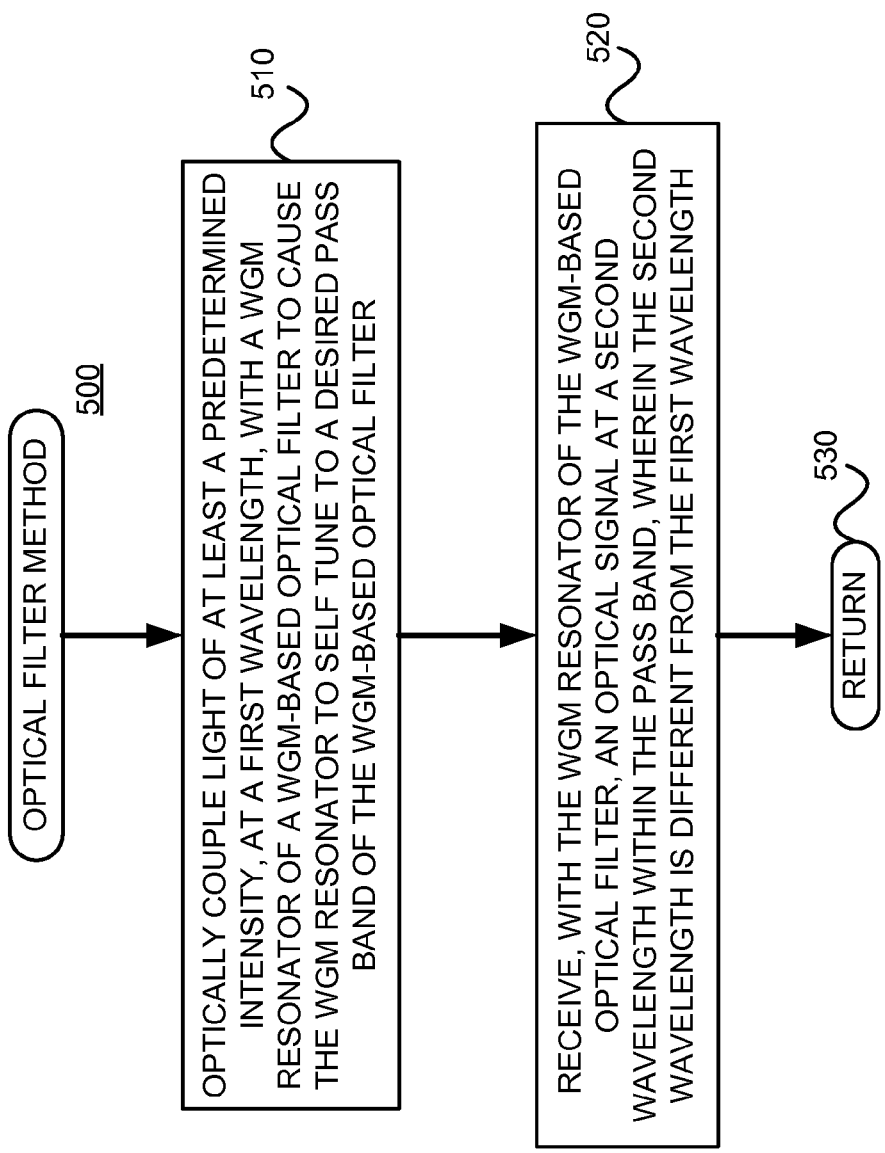
FIG. 5 is a flow diagram of an example method for providing optical filtering in a manner consistent with the present invention.

FIG. 5 is a flow diagram of an example method 500 for providing optical filtering in a manner consistent with the present invention. First, light of at least a predetermined intensity, at a first wavelength, is optically coupled with a WGM resonator of a WGM-based optical filter to cause the WGM resonator to self tune to a WGM corresponding to a desired pass band of the WGM-based optical filter. (Block 510) Then, an optical signal at a second wavelength within the pass band is received with the WGM resonator of the WGM-based optical filter, wherein the second wavelength is different from the first wavelength. (Block 520)

In some example methods, the light is optically coupled with the WGM resonator via an optical waveguide, and the predetermined intensity (in the optical waveguide) is between 1 mW and 10 mW (e.g., 2 mW). Generally speaking, the higher the intensity of the light, the more stable the self tuning will be (e.g., against environmental changes, such as changes in ambient temperature). Further, the higher the intensity of the light, the broader the range of control. However, the example method 500 of FIG. 5 should work even if the intensity of the light within the optical waveguide is as low as 0.1 mW. Further, the inventors believe that embodiments using resonators made of a softer material will require control light having a lower power than embodiments using resonators made of a harder material (because the resonator made of a softer material should be easier to deform).

In some example methods, the first and second wavelengths are at least 1 pm different. The example method has been shown to work in an experiment in which the first and second wavelengths were 0.3 µm different. (See §4.3.2 below.)

Although the example method of FIG. 5 is described in the context of an optical demultiplexer, an optical filtering method consistent with the example of FIG. 5 may be used to filter out (or separate) side bands, such as those that result when light is modulated by a radio wave.

§4.1.3 Example Demultiplexer

Figure 6:
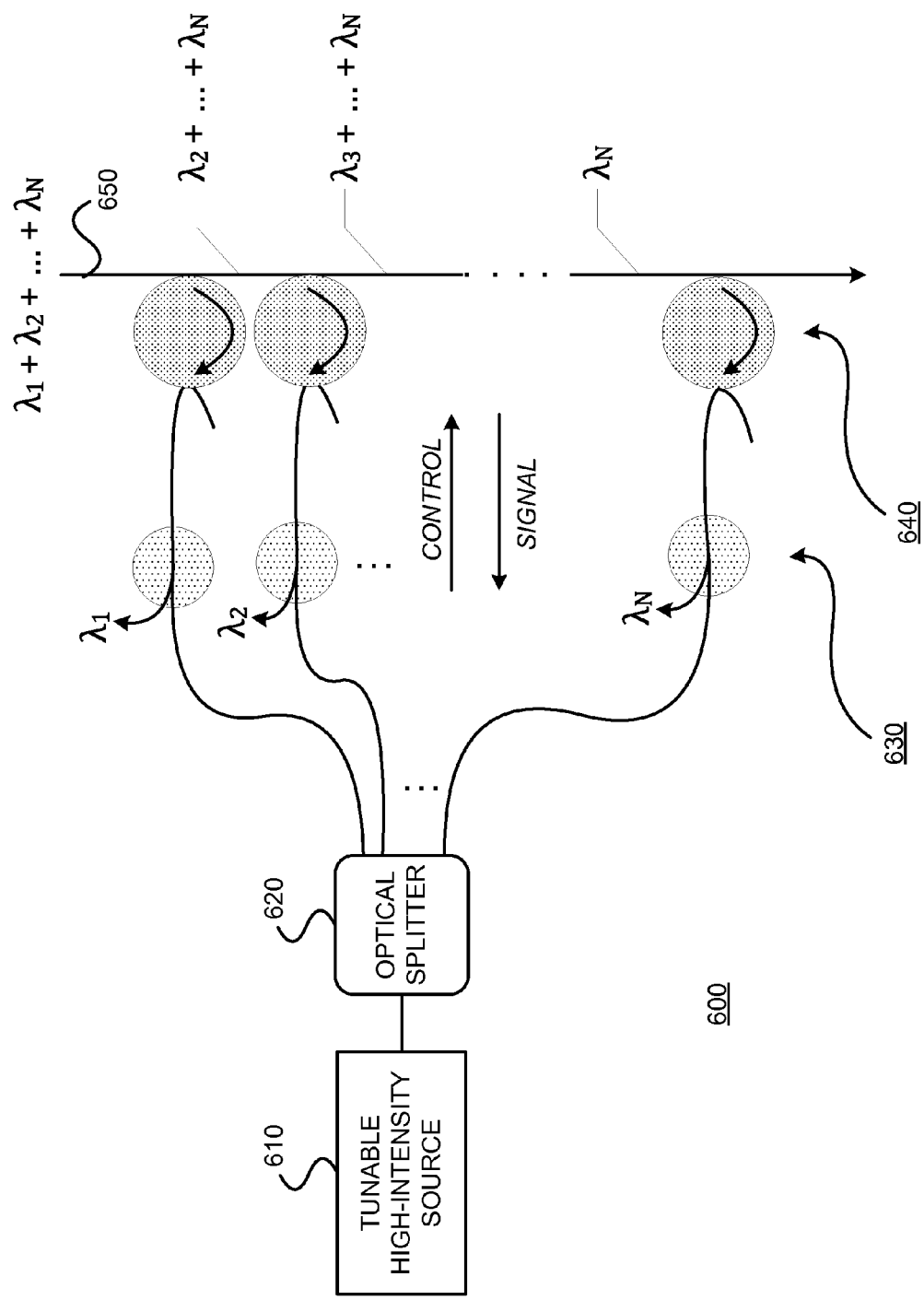
FIG. 6 illustrates an example wavelength division demultiplexer consistent with the present invention.

FIG. 6 illustrates an example wavelength division demultiplexer 600 consistent with the present invention. The example optical wavelength division demultiplexer 600 includes a light source for outputting light at a first wavelength having at least a predetermined intensity (e.g., a tunable high-intensity light source 610), an optical carrier 650 for carrying a multiplexed optical signal composed of a plurality of wavelengths, and a plurality of optical resonators 640. As shown, each of the plurality of optical resonators 640 are optically coupled with the optical carrier 650 and are optically coupled with an output of the light source 610 (e.g., via an optical splitter 620 and circulators 630). In the example demultiplexer 600 of FIG. 6, each of the plurality of optical resonators 640 has a different effective optical path length. A plurality of output optical carriers, each being optically coupled with a respective one of the plurality of optical resonators 640 (e.g., via a circulator 630) provide separated signal components $\lambda_1$-$\lambda_N$.

Responsive to the light source 610 outputting (via the splitter 620) light at the first wavelength having at least the predetermined intensity, (i) each of the plurality of optical resonators 640 provides a narrow optical pass band, and (ii) the optical signal composed of the plurality of wavelengths (on carrier 650) is demultiplexed such that each of the plurality of output optical carriers receive one of the plurality of wavelengths of the multiplexed optical signal.

Although not shown in FIG. 6, each of the plurality of optical resonators 640 may be optically coupled with a respective one of the plurality of outputs of a high-intensity light source system. In this example embodiment, each of the plurality of optical resonators may have, in the absence of the control light, a different effective optical path length, or may have the same or similar effective optical path length. In the presence of the control light, the different control light input can cause self tuning each resonator at a different wavelength).

As should be appreciated from the foregoing, a multiplexed signal consisting of different wavelength components can be decomposed into individual components by a demultiplexer. The resonator for wavelength $\lambda_1$ removes the signal component from the fiber that carries the signal. The removed component enters the resonator and picked up by the other fiber. The circulator is a directional coupler, splitting light according to the travel direction. Thus, the component $\lambda_1$ can be isolated. Cascading the resonator-circulator allows all of the signal components to be isolated.

§4.1.3.1 Filter Spectrum

The spectrum of the resonator (intensity of light in the fiber after the resonator, plotted as a function of wavelength) is depicted for a toroidal resonator in FIGS. 7A-7C. The positions of the dips are determined by the radius a of the toroid, the radius b of the cross section (cut), and the refractive index RI of the resonator.

§4.1.3.2 Example Components

Components known in the field of whispering gallery mode resonators, such as those described in U.S. Pat. No. 7,491,491, titled "DETECTING AND/OR MEASURING A SUBSTANCE BASED ON A RESONANCE SHIFT OF PHOTONS ORBITING WITHIN A MICROSPHERE," issued on Feb. 17, 2009 to Stephen ARNOLD and Iwao TERAOKA (incorporated herein by reference) and/or those described in eight papers referenced in §1 above for example, may be used instead of, or in addition to, the components described above.

§4.2 Setting or Controlling a Self Tuned Wavelength of a WGM Resonator

Figure 8:
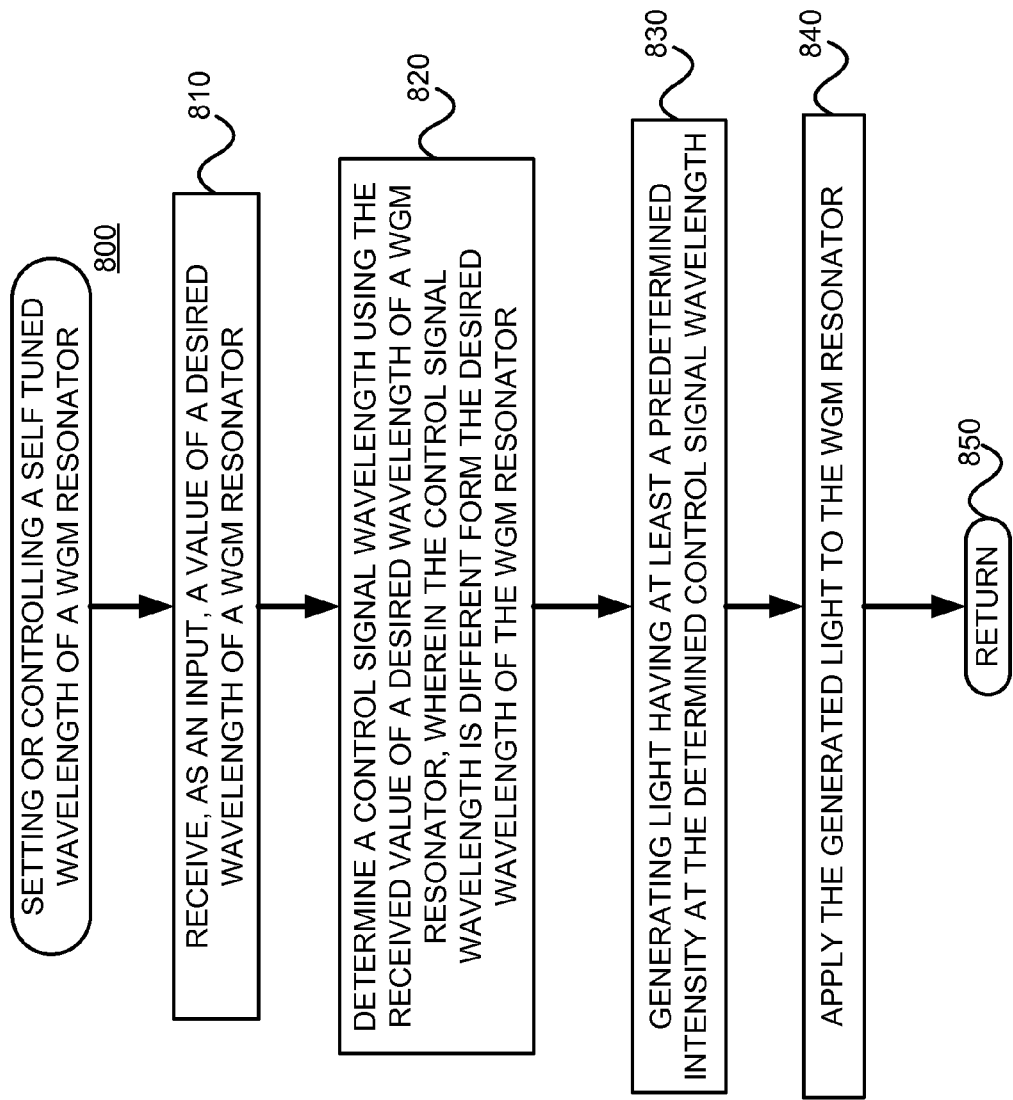
FIG. 8 is a flow diagram of an example method for controlling a wavelength of a WGM of an optical resonator in a manner consistent with the present invention.

FIG. 8 is a flow diagram of an example method 800 for controlling a self tuned wavelength of a WGM resonator in a manner consistent with the present invention. The example method 800 may receive, as an input, a value of a desired wavelength of a WGM resonator. (Block 810) Then, a control signal wavelength is determined using the received value of a desired wavelength of a WGM resonator, wherein the control signal wavelength is different form the desired wavelength of the WGM resonator. (Block 820) Light having at least a predetermined intensity at the determined control signal wavelength is then generated (Block 830) and applied to the WGM resonator (Block 840).

Referring back to block 820, in some examples, the act of determining a control signal wavelength is performed by applying the received value of a desired wavelength of a WGM resonator to an arithmetic function. In other examples, the act of determining a control signal wavelength is performed by applying the received value of a desired wavelength of a WGM resonator as an input to a lookup table.

In some example methods, the light is optically coupled with the WGM resonator via an optical waveguide, and wherein the predetermined intensity (in the optical waveguide) is between 1 mW and 10 mW (e.g., 2 mW). Generally speaking, the higher the intensity of the light, the more stable the self tuning will be (e.g., against environmental changes such as changes in ambient temperature). Further, the higher the intensity of the light, the broader the range of control. However, the example method 800 of FIG. 8 should work even if the intensity of the light within the optical waveguide is as low as 0.1 mW.

In some example methods, the first and second wavelengths are at least 1 pm different. The example method has been shown to work in an experiment in which the first and second wavelengths were 0.3 µm different.

§4.3 Experimental Results

The present inventors performed an experiment that used an intense laser of a wavelength (e.g., 1.3 µm) in a range different from that of WDM signals (e.g., ~1.5 µm). The laser was superimposed onto the signal waves, and the combined wave was fed into the resonator that serves as a filter. The signal was separated from the filtered wave by a splitter.

The present inventors believe that when an intense light is pumped into a resonator, it will try to accommodate an intense WGM by slightly deforming itself, since the presence of WGM within the resonator lowers the overall free energy. The mechanical deformation will also change the pass-band wavelengths in the signal's wavelength range. The relationship between the wavelength of the intense, pump-in light and the pass band wavelengths depends on the dimension and other geometrical factors of the resonator. Therefore, for a single intense light source, resonators of different pass-band wavelengths can be prepared. Fine adjustment of the pass-band wavelength can be accomplished by adjusting the power of the light that pumps into the resonator by use of an adjustable attenuator or by changing the wavelength of the pump-in laser.

More specifically, a whispering gallery mode (WGM) can be excited in a dielectric medium of a circular cross section such as a sphere, cylinder and a toroid. The light traveling around the circular orbit by total internal reflection has a high quality factor (Q), and therefore narrow lines of resonance. This property makes the resonator suitable for use as filters in optical fiber signal transmission. A typical dielectric medium is silica. Its refractive index changes by a tiny fraction when the resonator's temperature varies, but the change is sufficient to move the resonance wavelength by a lot more than its line width. That makes the high-Q filter's performance susceptible to environmental changes.

Thus, the present inventors discovered that the resonator can adjust itself to tune to a fixed pump-in wavelength and continue to do so when the ambient temperature changed by a few Kelvin. The inventors' findings have opened up the possibility of stabilizing the resonator's performance as a filter despite environmental changes. Furthermore, as the tuning can be controlled by adjusting the power of the pump-in laser, the resonance wavelengths, including those away from that of the pump-in laser, can be tuned. They include the wavelengths for telecommunication signals.

Further experiments performed by the present inventors are introduced below. Example embodiments consistent with the present invention may use procedures, components and parameter values described in these experiments.

§4.3.1 Agarwal-Teraoka I

The present inventors performed an experiment in which a silica microsphere was coupled with a pair of head-on single-ended tapers to demonstrate that the resonator, by itself, can latch onto a specific mode when the wavelength of a high-power laser changes over many resonance peak widths in both directions. The experiment demonstrated that, with a high power of a pump-in laser, the resonator can self-tune its resonance to a fixed wavelength when the resonator temperature changes or the gas flow surrounding the resonator changes. However, the resonance is lost when the intensity is too low. See the article, Monica Agarwal and Iwao Teraoka, "Mode Latching and Self Tuning of Whispering Gallery Modes In a Stand-Alone Silica Microsphere," *Applied Physics Letters*, Volume 101, Issue 25, pp. 251105-251105-4 (American Institute of Physics, December 2012) (Referred to as Agarwal-Teraoka I and incorporated herein by reference).

The exact wavelength of the pass band can be controlled by adjusting one or more of:

1. Intensity of the 1.3 µm light (use a attenuator);
2. Wavelength of the 1.3 µm light (adjust the current of the laser); and
3. Temperature of the resonator, in a manner that should be apparent to one of ordinary skill in the art, without undue experimentation.

§4.3.2 Agarwal-Teraoka II

The present inventors performed a further experiment in which they demonstrated dynamic control of the optical path length for probe light in a spherical dielectric resonator simply by multiplexing intense control light of another color and adjusting its wavelength. See the article, Monica Agarwal and Iwao Teraoka, "All-Photonic, Dynamic Control of Optical Path Length In a Silica Sphere Resonator," *Optics letters*, Vol. 38, Issue 15, pp. 2640-2643 (Optical Society of America, Aug. 1, 2013) (Referred to as Agarwal-Teraoka II and incorporated herein by reference.). In Agarwal-Teraoka II, the fractional change in the path length, monitored by the resonance wavelengths of whispering gallery modes of the probe light, was nearly equal to the fractional change in the wavelength of the control light. The control was effective in both increasing and decreasing the wavelength, but the weaker the control light or the faster the wavelength change, the narrower the range of control.

WGMs in dielectric resonators of a circular symmetry have evolved as vital platforms for laser action, wavelength filtering, sensing, etc. (See, e.g., A. B. Matsko, A. A. Savchenkov, D. Strekalov, V. S. Ilchenko, and L. Maleki, IPN Progr. Rep. 42-162, 1 (2005); and V. S. Ilchenko and A. B. Matsko, IEEE J. Sel. Top. Quantum Electron. 12, 15 (2006), both incorporated herein by reference.) Light travels the interior side of the resonator's surface by total internal reflection to complete a circular orbit. A narrow-line resonance is observed when the optical path length of one cycle contains an integral number (l>>1) of wavelength λ (in vacuum):

$$2\pi na = l\lambda \quad (1)$$

where a is the radius of the resonator and n is its refractive index (RI). To be strict, n is the effective RI for the mode ($n_{eff}$), as a part of the traveling wave resides exterior to the resonator. However, if the RI contrast of the resonator to the surroundings is large, such as silica in air, n is close to the RI of the resonator. Equation (1) shows that the resonance wavelength is a marker of na, and the resonance wavelength changes when n (or $n_{eff}$) or a changes. Sensor application of WGM detects the change in na caused by a change in the surrounding environment as a resonance shift. (See, e.g., I. Teraoka and S. Arnold, J. Opt. Soc. Am. B 23, 1381 (2006), incorporated herein by reference.) Agarwal-Teraoka II demonstrated that the resonance at one wavelength can be controlled dynamically through a change in na by feeding intense light of another wavelength and adjusting its wavelength.

A silica microresonator that sits on top of the gap between a head-on pair of single-ended tapers was used to demonstrate mode latch and self-tuning of WGM. (See, e.g., Agarwal-Teraoka I.) The source wavelength at 1.31 µm was scanned by 6 ppm or less in a triangular wave and fed into one of the tapers. The other taper picked up a WGM when the source wavelength matched one of the resonance wavelengths in the scan. When the feed light was intense and its wavelength was changed slowly in a narrow range, the light in the pick-up fiber was always intense throughout the up and down scans of the wavelength, indicating that the resonator latched to a specific WGM despite changes in the source wavelength. Alternatively, the resonator's temperature was changed by ~2 K while supplying a fixed wavelength of light and monitored the light intensity in the pick up fiber. When the feed light was intense, the resonator was always in resonance (self-tuning), although the resonance modes switched once in a while. In these experiments, "intense" implies just a few milliwatt in the feed fiber; the light that transfers from the taper to the resonator is even less. However, the high quality factor Q intensifies the WGM by many orders of magnitude.

Past studies (See, e.g., V. B. Braginsky, M. L. Gorodetsky, and V. S. Ilchenko, Phys. Lett. A 137, 393 (1989); L. Collot, V. Lefèrvre-Seguin, M. Brune, J. M. Raimond, and S. Haroche, Europhys. Lett. 23, 327 (1993); T. Carmon, L. Yang, and K. J. Vahala, Opt. Express 12, 4742 (2004); H. Rokhsari, S. M. Spillane, and K. J. Vahala, Appl. Phys. Lett. 85, 3029 (2004); and C. Schmidt, A. Chipouline, T. Pertsch, A. Tünnermann, O. Egorov, F. Lederer, and L. Deych, Opt. Express 16, 6285 (2008), each incorporated herein by reference.) ascribed the mode latch in a silica resonator to a thermal mechanism: absorption of intense WGM heats the resonator, increasing the RI of silica, and with a small help from thermal expansion, na increases. For the thermal mechanism to latch the resonator to a WGM, the pump-in wavelength must be on the blue side of the resonance. In that environment, a decrease in the resonator temperature would decrease na, thus decreasing the difference between the pump-in wavelength and the resonance wavelength, and the WGM would intensify to raise the temperature. Therefore, the thermal mechanism alone can cause the mode latch and self-tuning. (See, e.g., Carmon, L. Yang, and K. J. Vahala, Opt. Express 12, 4742 (2004), incorporated herein by reference.) However, the pattern of the mode intensity change in the up and down scans of the pump-in wavelength over various scan ranges indicated a different mechanism for the stabilization. (See, e.g., M. Agarwal and I. Teraoka, Appl. Phys. Lett. 101, 251105 (2012), incorporated herein by reference.) The present inventors considered that the total free energy consists of the negative polarization energy in the dielectric resonator and the strain energy, and these energies couple to change the resonator's diameter, as the strain shifts the minimum of the polarization free energy. In this optomechanical mechanism, the sphere size at the WGM orbit increases or decreases to minimize the overall free energy. The two mechanisms can cooperate to enhance the stabilization.

Figure 1:
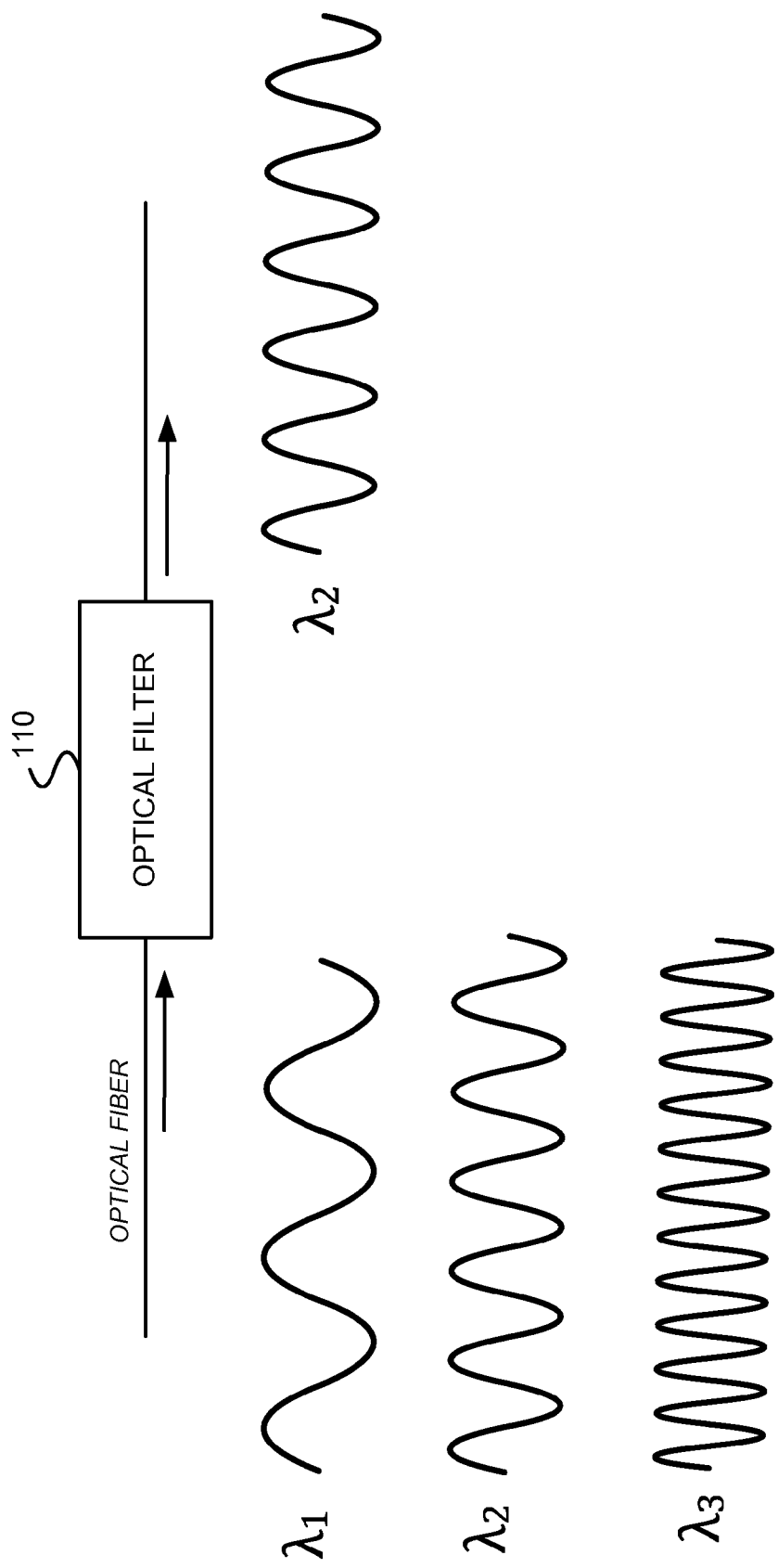
FIG. 1 illustrates the use of an optical filter for extracting a component of a wavelength divisional multiplexed (WDM) signal.

For the study presented in Agarwal-Teraoka II, the present inventors added a second laser at 1.61 µm, a coupler, a demultiplexer, and a second photodetector (PD). (See FIG. 1(a) of Agarwal-Teraoka II.) The current to the 1.61 µm laser was scanned in a triangular wave with a period of 40.96 ms from 30 to 40 mA, changing the wavelength from 1610.6607 to 1610.6888 nm, throughout (See FIG. 1(b) of Agarwal-Teraoka II.) The power before the 20 dB attenuator changed from 1.78 to 3.27 mW in the scan. The range and ramp rate of another triangular wave for scanning the 1.30 µm laser current were varied, but the latter period T was an integer multiple of 40.96 ms. The power of the 1.30 µm light was changed by inserting an attenuator or starting the scan at a different start current.

Figure 2:
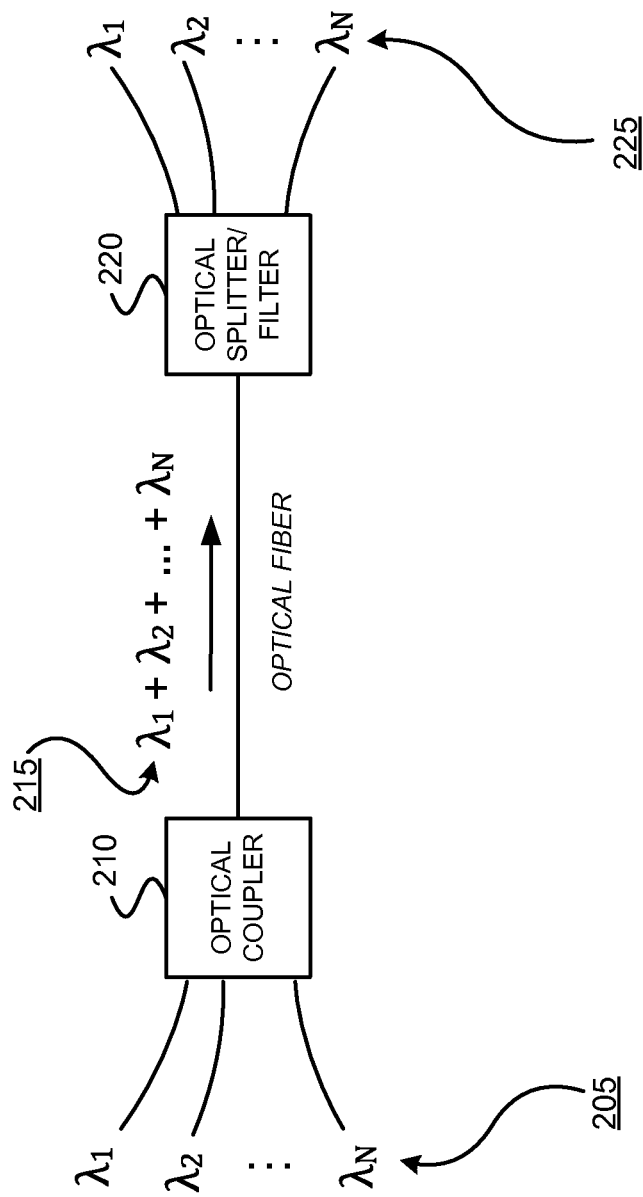
FIG. 2 illustrates wavelength division multiplexing and demultiplexing.

The 1.61 µm PD signal, plotted as a function of the laser current, was essentially a resonance spectrum showing many modes in the 28.2 pm scan. (See FIG. 2(a) of Agarwal-Teraoka II.) The spectrum was busy with peaks, since the high RI contrast of silica to air allows many radial and meridional modes. When the 1.30 µm light was applied without an attenuator in a slow scan (T=81.76 s, 77.5-80 mA, 1303.3039-1303.3303 nm; See FIG. 2(b), line 1 in Agarwal-Teraoka II.), the time trace of the PD signal hardly resembled the resonance spectrum, but consisted of ~20 sections, some of them being nearly horizontal, unlike the rectangle triangular pattern observed in the thermal mechanism. (See, e.g., Carmon, L. Yang, and K. J. Vahala, Opt. Express 12, 4742 (2004), incorporated herein by reference.) There were spikes at the section boundaries. The down scan of the wavelength gave more frequent changes of the signal level than did the up scan. The signal seldom touched the dark level. When the ramp was faster or the power was lower, the time trace showed a resonance spectrum with nearly symmetric up and down scans (lines 2, 3).

Figure 3:
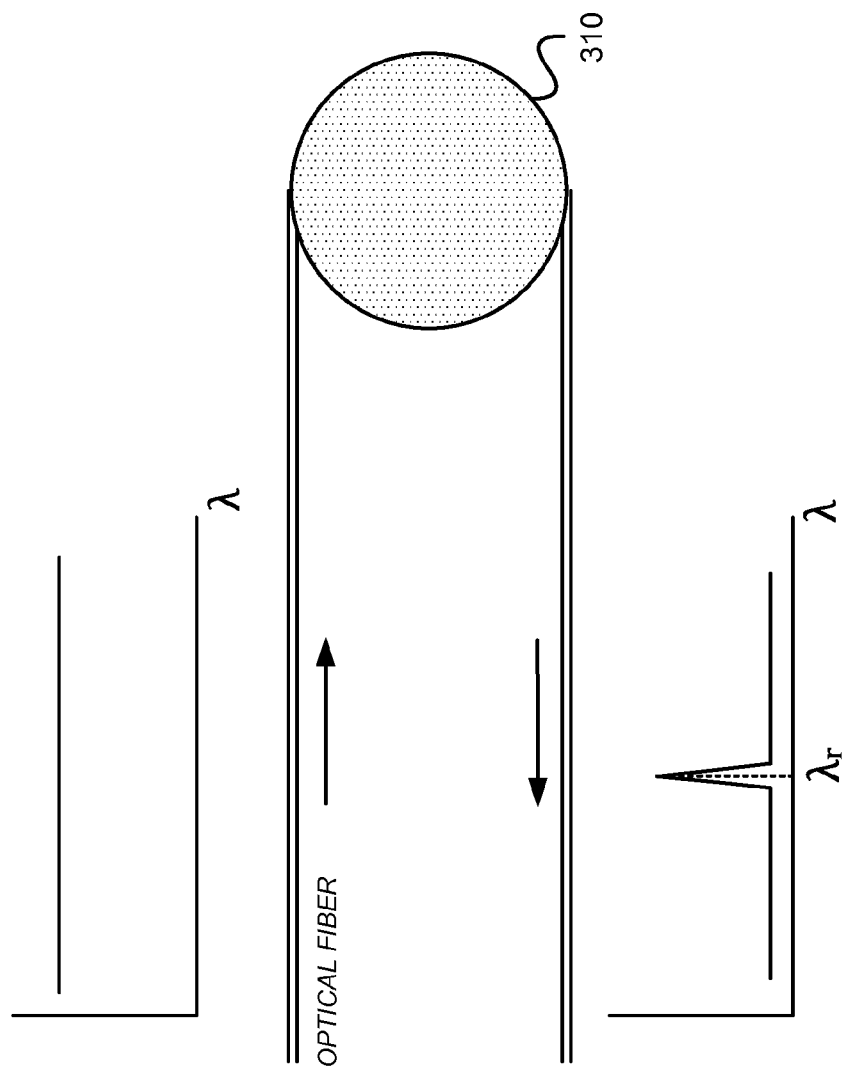
FIG. 3 illustrates the narrow pass band wavelength of a WGM resonator.

In Agarwal-Teraoka II, the inventors tracked the resonance shift for the 20 dB attenuated 1.61 μm light in its down scan while the wavelength $\lambda_{1.30}$ of the 1.30 μm light was scanned at a lower frequency simultaneously. The 1.61 μm resonance $\lambda_{res}$ shifted nearly in unison, allowing us to estimate the shift for each 1.61 μm scan. FIG. 3(a) of Agarwal-Teraoka II shows the result for three periods when the 1.30 μm laser current was changed from 39.5 to 40 mA with T=16.38 s (no attenuation; the power in the feed fiber was 3.27 mW at 40 mA). A period of the 1.30 μm scan contained 400 scans of the 1.61 μm wavelength, and thus 400 estimates of the shift. As $\lambda_{1.30}$ changed by 3.4 pm in tandem with the laser current, the 1.30 μm PD signal moved up and down, but stayed at a high level. While $\lambda_{1.30}$ increased, $\lambda_{res}$ also increased at a constant rate. As $\lambda_{1.30}$ turned to a down scan, $\lambda_{res}$ changed to a blue shift. The time traces of the 1.30 μm PD signal and the $\lambda_{res}$ shift repeated as long as the $\lambda_{1.30}$ scan continued. The rate of the $\lambda_{res}$ shift was 0.323 to 0.334 ppm/s, common to up and down scans, and was almost identical to the ramp rate of $\lambda_{1.30}$, 0.322 ppm/s. The small mismatch was ascribed to calibration errors in dynamically scanned laser. There was also mode-to-mode variation in the shift rate, as each mode has a different spatial distribution of WGM field within the resonator. Line 3 in the figure of Agarwal-Teraoka II is the mean of the shift traces for different modes. The inventors saw consistently a $\lambda_{res}$ shift in phase with the $\lambda_{1.30}$ scan without interruptions when the $\lambda_{1.30}$ scan range was narrow, and the two shifts were nearly identical in parts per million. The 1.30 μm light forces the resonator to latch itself to the changing $\lambda_{1.30}$ and thus change na without disruption or delay. Equation (1) applies independently to WGM at the two wavelengths. It was not necessary to finely tune the start current of the 1.30 μm laser.

Frequent downward combs in the 1.30 μm PD signal in the up scan and equally frequent upward combs in the down scan were observed. The direction of the combs can be either way for a given scan direction, but the directions of the combs were always opposite in up and down scans of the wavelength.

Lowering the intensity of the 1.30 μm light led to disruption in the $\lambda_{res}$ shift, and eventually loss of response. FIG. 3(b) of Agarwal-Teraoka II shows such an example. The 1.30 μm light was attenuated by 5 dB (the power was 3.69 mW at 80 mA). The $\lambda_{1.30}$ was changed by 21.1 pm, ~6 times as broad as in FIG. 3(a) of Agarwal-Teraoka II, and its ramp rate was 0.494 ppm/s. One period of the $\lambda_{1.30}$ scan contained 1600 periods of the 1.61 μm scan. The time trace of the 1.30 μm PD signal consisted of sections of a regular resonance spectrum and sections with a sustained level. When the 1.30 μm signal was at a sustained high level, the 1.61 μm spectrum exhibited constant red and blue shifts at 0.411-0.446 ppm/s, which was lower than the $\lambda_{1.30}$ ramp rate. The smaller rates indicated weaker control of na by the weak 1.30 μm light.

For FIG. 3(c) of Agarwal-Teraoka II, the inventors restored the 0 dB attenuation for the 1.30 μm light, but kept the same scan range and ramp rate as in FIG. 3(b). The resultant $\lambda_{res}$ shift was at a constant rate except frequent disruptions. In the up scan, the red shift of $\lambda_{res}$ fell off quickly, but resumed at the same rate after the small fall. In the down scan, the abrupt change occurred in the opposite direction (small rise): the na rather exhibited a sudden increase. Whenever there was a rapid change in the 1.30 μm intensity with spikes, indicating a mode switch, there was a sudden change in the $\lambda_{res}$ shift rate. The timings for the abrupt changes in lines 2 and 3 coincided. The constant rate of shift is 0.533-0.545 ppm/s, higher than the ramp rate of $\lambda_{1.30}$. The 1.30 μm light regulated the resonator's na by engaging it into one of WGM at 1.30 μm.

The increase of na at a steady rate and occasional mode switch during the up scan of $\lambda_{1.30}$ can be explained by either a thermal or optomechanical mechanism. In the thermal mechanism, when the resonator is disengaged, the resonator cools. If the resonance wavelengths are densely populated, $\lambda_{1.30}$ will latch to one of the resonance wavelengths that shift blue. The optomechanical mechanism does not require cooling, but the cooling does not prevent the resonator from latching to another WGM. It is the down scan that distinguishes the two mechanisms. Stabilization in the thermal mechanism requires that the $\lambda_{1.30}$ scan turn downward while the resonator is being latched. In this scenario, when the resonator gets disengaged from the mode by some reason during the down scan, the resonator will cool, shifting the resonance to blue. Since the shifting is more rapid compared with the ramp rate, the resonator will not latch to any other mode until $\lambda_{1.30}$ resumes an up scan. When disengaged during either up or down scan, the subsequent cooling will rapidly decrease $\lambda_{res}$. The situation is different in the optomechanical stabilization. It is the strain of the resonator that will adjust itself to latch to one of the modes. During the up scan, the mode latch will carry the resonator into an expanded state, and disengagement will lead to shrinkage (assuming $d\lambda_{res}/da>0$). The change will be the opposite during the down scan. FIG. 3(c) of Agarwal-Teraoka II showed the opposite directions upon disengagement, precluding the thermal mechanism as a main route for the mode latch, and rather supporting a thermodynamically reversible mechanism such as the optomechanical one.

In FIG. 3(c) of Agarwal-Teraoka II, the $\lambda_{res}$ shift ramp was faster than the $\lambda_{1.30}$ ramp by 8%-10%. In effect, there was amplification of the frequency modulation. One of the possible causes is a radial mode difference between the WGMs at the two wavelengths. To lower the strain energy at 1.30 μm, the resonator will accommodate a WGM that runs deep from the resonator surface. Such a mode has a smaller neff compared with the mode that runs close to the surface. For $n_{eff}$a to change by a given amount, a greater change in na is required. Then, the 1.61 μm mode, which is likely the surface mode since it must couple to the tapers, will experience a greater shift than anticipated from the 1.30 μm scan.

The inventors considered how the $\lambda_{res}$ shift changes with the $\lambda_{1.30}$ ramp rate. Since the life time of WGM is short (~10 ns), thermal relaxation time (=heat capacity/heat escape rate; ~0.5 s (See, e.g., H. N. Luo, H. S. Kim, M. Agarwal, and I. Teraoka, Appl. Opt. 52, 2834 (2013), incorporated herein by reference.)) and mechanical relaxation time (=mechanical/resonance angular frequency; ~10 μs (See, e.g., Y.-S Park and H. Wang, Opt. Express 15 16471 (2007), incorporated herein by reference.)) are relevant. The mechanical relaxation is faster than the thermal one. Therefore, the latter will govern the time scale of the overall change.

When the $\lambda_{1.30}$ ramp rate was increased (T was shortened) for the same scan range as the one in FIG. 3(c) of Agarwal-Teraoka II, the constant slope in the $\lambda_{res}$ shift trace increased proportionally, but the rate of change during the sudden drop or rise remained identical. Consequently, the two rates of change approached each other. With a further increase in the ramp rate, a thermo-mechanical relaxation starts to hinder the resonator from following the ramp. Therefore, the parts in the $\lambda_{res}$ shift plot that change together with the $\lambda_{1.30}$ ramp shrink, and the overall shift range narrows. Open symbols in FIG. 4 of Agarwal-Teraoka II are a plot of the maximum $\lambda_{res}$ shift range in one cycle of the $\lambda_{1.30}$ scan as a function of the ramp rate for different powers of the control light (0 dB, −5 dB). The scan range was 26.4 pm, sufficiently broad to see disruptions in the $\lambda_{res}$ shift plot. The inventors also plotted the broadest range in the $\lambda_{res}$ shift plot between adjacent disruptions (closed symbols). At 0 dB, peaking occurs, seen when the ramp rate becomes comparable to the relaxation; when the ramp is fast, the next mode can latch the resonator before the relaxation, which resembles a $\lambda_{res}$ shift without disruption.

In conclusion, in Agarwal-Teraoka II, the inventors demonstrated a control of WGM resonance wavelength by adjusting the wavelength of a second light fed into the resonator. The dynamic control may be useful in regulating an exact emission wavelength of a microcavity laser and controlling the pass band of a tunable filter.

§4.4 Refinements, Alternatives and Extensions

Although exemplary embodiments consistent with the present invention describe microsphere resonators, other configurations of WGM resonators, such as, for example, (micro) cylinders, (micro)disks, (micro)rings, (micro)racetrack, (micro)bottle resonator and (micro)toroids (or any other resonator geometry that can support a WGM) may be used.

Although the experimental resonators were described as being silica, other materials for a resonator such as amorphous sapphire, glass, silicon, silicon nitride, silicon oxynitride, gallium nitride (GaN), gallium arsenide (GaAs), indium arsenide (InAs), etc., may be used in a manner consistent with the present invention.

Although some exemplary embodiments described above used a tapered optical fiber to evanescently couple light to the microresonator, other optical waveguides (such as, for example, eroded fiber, lithographed waveguide, rib waveguides, channel waveguides, nanowires, and other structures (or media) capable of supported a guided wavemode) may be used instead.

In at least some exemplary embodiments consistent with the present invention, the microresonator may have a diameter of between 1 μm and 10 mm, and preferably between 10 μm and 1 mm though resonators having other diameters may be used.

In some embodiments consistent with the present invention, the laser wavelength of the control signal is 1,310 nm and the desired wavelength for the self tuning by the WGM resonator is 1,480-1640 nm, and has a drive power as little as 0.1 mW, but preferably between 1 and 10 mW. Naturally, other laser wavelengths (such as 1.06 μm, 830 nm, etc.) and drive powers (such as 100 mW, etc.) may be used.

Our invention is not limited to the specific example embodiments shown. We regard our invention to include any patentable subject matter described in this application.

What is claimed is:

1. A method comprising:
   a) optically coupling light of at least a predetermined intensity, at a first wavelength, with a whispering gallery mode (WGM) resonator of a WGM-based optical filter to cause the WGM resonator to self tune to a desired pass band of the WGM-based optical filter; and
   b) receiving, with the WGM resonator of the WGM-based optical filter, an optical signal at a second wavelength within the pass band, wherein the second wavelength is different from the first wavelength.

2. The method of claim 1, wherein the light is optically coupled with the WGM resonator evanescently, via an optical waveguide, and wherein the predetermined intensity is at least 0.1 mW.

3. The method of claim 1, wherein the light is optically coupled with the WGM resonator evanescently, via an optical waveguide, and wherein the predetermined intensity is between 1 mW and 10 mW.

4. The method of claim 3, wherein the predetermined intensity is approximately 2 mW.

5. The method of claim 1, wherein the first and second wavelengths are at least 1 pm different.

6. The method of claim 1, wherein the first and second wavelengths are at least 0.3 μm different.

7. An optical wavelength division demultiplexer comprising:
   a) a light source for outputting light at a first wavelength having at least a predetermined intensity;
   b) an optical carrier for carrying a multiplexed optical signal composed of a plurality of wavelengths;
   c) a plurality of optical resonators, each of the plurality of optical resonators being
      1) optically coupled with the optical carrier, and
      2) optically coupled with an output of the light source, wherein each of the plurality of optical resonators has a different effective optical path length;
   d) a plurality of output optical carriers, each being optically coupled with a respective one of the plurality of optical resonators,
      whereby, responsive to the light source outputting light at the first wavelength having at least the predetermined intensity, (i) each of the plurality of optical resonators self tune to a whispering gallery mode (WGM), thereby providing a narrow optical passband, and (ii) the optical signal composed of the plurality of wavelengths is demultiplexed such that each of the plurality of output optical carriers receive one of the plurality of wavelengths of the multiplexed optical signal.

8. The optical wavelength division multiplexer of claim 7 further comprising a plurality of optical circulators, wherein each of the plurality of optical resonators is optically coupled with the output of the light source via a respective one of the plurality of optical circulators, and
   wherein each of the plurality of output optical carriers is optically coupled with a respective one of the plurality of optical resonators via a respective one of the plurality of optical circulators.

9. An optical wavelength division demultiplexer comprising:
   a) a light source system for providing a plurality of output control light at a plurality of control wavelengths, each of the plurality of output control light having at least a predetermined intensity;
   b) an optical carrier for carrying a multiplexed optical signal composed of a plurality of wavelengths;
   c) a plurality of optical resonators, each of the plurality of optical resonators being
      1) optically coupled with the optical carrier, and
      2) optically coupled with a respective one of the plurality of outputs of the light source system;

d) a plurality of output optical carriers, each being optically coupled with a respective one of the plurality of optical resonators, whereby, responsive to the light source system providing the plurality of output light at the plurality of control wavelengths, each having at least the predetermined intensity, (i) each of the plurality of optical resonators self tune to a whispering gallery mode (WGM), thereby providing a narrow optical passband, and (ii) the optical signal composed of the plurality of wavelengths is demultiplexed such that each of the plurality of output optical carriers receive one of the plurality of wavelengths of the multiplexed optical signal.

10. The optical wavelength division demultiplexer of claim 9 wherein each of the plurality of optical resonators has a different effective optical path length.

11. The optical wavelength division demultiplexer of claim 9 wherein each of the plurality of optical resonators has the same or similar effective optical path length.

12. The optical wavelength division multiplexer of claim 9 further comprising a plurality of optical circulators, wherein each of the plurality of optical resonators is optically coupled with a respective one of the plurality of output control light via a respective one of the plurality of optical circulators, and wherein each of the plurality of output optical carriers is optically coupled with a respective one of the plurality of optical resonators via a respective one of the plurality of optical circulators.

13. A method for setting or controlling a wavelength of a whispering gallery mode (WGM) of an optical resonator, the method comprising:

a) receiving, as an input, a value of a desired wavelength of a WGM of the optical resonator;

b) determining a control signal wavelength using the received value of a desired wavelength of a WGM of the optical resonator, wherein the control signal wavelength is different from the desired wavelength of a WGM of the optical resonator;

c) generating light having at least a predetermined intensity at the determined control signal wavelength; and d) applying the generated light to the optical resonator to cause the WGM resonator to self tune to a WGM.

14. The method of claim 13 wherein the act of determining a control signal wavelength is performed by applying the received value of a desired wavelength of a WGM of the optical resonator to an arithmetic function.

15. The method of claim 13 wherein the act of determining a control signal wavelength is performed by applying the received value of a desired wavelength of a WGM of the optical resonator as an input to a lookup table.

16. The method of claim 13, wherein the predetermined intensity is at least 0.1 mW.

17. The method of claim 13, wherein the predetermined intensity is between 1 mW and 10 mW.

18. The method of claim 17, wherein the predetermined intensity is approximately 2 mW.

19. The method of claim 13, wherein the first and second wavelengths are at least 1 pm different.

20. The method of claim 13, wherein the generated light is applied to the optical resonator via evanescent coupling.

* * * * *